United States Patent [19]

Tsuchimoto et al.

[11] Patent Number: 4,547,689
[45] Date of Patent: Oct. 15, 1985

[54] ROTARY ELECTRIC MACHINE OPERABLE WITH CHANGEABLE RATED VOLTAGE

[75] Inventors: Hiroshi Tsuchimoto, Ichikawa; Yasuro Suzuki, Narashino; Takeyoshi Owada, Funabashi, all of Japan

[73] Assignee: Hitachi, Ltd., Tokyo, Japan

[21] Appl. No.: 636,356

[22] Filed: Jul. 31, 1984

Related U.S. Application Data

[63] Continuation of Ser. No. 401,022, Jul. 22, 1982, abandoned.

[30] Foreign Application Priority Data

Jul. 24, 1981 [JP] Japan .............................. 56-115044

[51] Int. Cl.$^4$ ........................................... H02K 11/00
[52] U.S. Cl. ......................................... 310/71; 310/87
[58] Field of Search ................... 310/71, 87, 89, 88, 310/180, 184; 318/220, 225; 339/31, 32

[56] References Cited

U.S. PATENT DOCUMENTS

| | | | |
|---|---|---|---|
| 2,321,999 | 6/1943 | Dalton | 310/71 X |
| 2,507,242 | 5/1950 | Bost | 310/71 X |
| 2,543,131 | 2/1951 | Seifried | 310/71 |
| 2,552,028 | 5/1951 | Blair | 310/71 |
| 2,722,645 | 11/1955 | Brown | 310/71 X |
| 2,772,215 | 12/1955 | Brown | 310/71 X |
| 2,922,054 | 1/1960 | Miller | 310/71 |
| 3,602,748 | 8/1971 | Locke | 310/71 |
| 3,604,964 | 9/1971 | Conrad | 310/71 |

FOREIGN PATENT DOCUMENTS 49-42401  4/1974  Japan .................................. 310/71

Primary Examiner—Mark O. Budd
Attorney, Agent, or Firm—Antonelli, Terry & Wands

[57] ABSTRACT

A rotary electric machine the rated voltage of which is changeable by changing-over the connections of the connection terminals of its armature winding. The connection terminals are classified into those used as power input terminals which are connected directly to AC power supply terminals regardless of the change-over of the rated voltage, and those which are not directly connected to the AC power supply terminals and are selectively connected to one another depending on the desired rate voltage. The former connection terminals used as the power input terminals are connected to the power supply terminals by lead wires, and the latter connection terminals are selectively connected to each other by using jumper conductors. The jumper conductors are held by a jumper conductor holder in a relation electrically insulated from one another. A plurality of such jumper conductor holders are prepared, and a suitable one is selected to deal with the selected power supply voltage driving the rotary electric machine.

28 Claims, 9 Drawing Figures

ROTARY ELECTRIC MACHINE OPERABLE WITH CHANGEABLE RATED VOLTAGE

This is a continuation of application Ser. No. 401,022, filed July 22, 1982, now abandoned.

BACKGROUND OF THE INVENTION

1. Field of the Invention

This invention relates to rotary electric machines, and more particularly to a rotary electric machine capable of operation with any one of two differnt rated voltages.

2. Description of the Prior Art

Electric motors which are capable of operation with any one of two different rates voltages by properly changing over the connection of the external connection terminals are now available in the market. As representative of such motors, those disclosed in U.S. Pat. No. 3,602,748 and Japanese utility Model Appication Laid-open No. 49-42401 are known. Both of the motors disclosed in the publications comprise two kinds of jumper conductor holders, one for a low voltage operation and the other for a high voltage operation. The jumper conductor holder for the low voltage operation is coupled to a connection terminal holder when the motor is to operate with the lower rated voltage. In this case, the armature winding of the motor is connected in the double star ($2\lambda$) connection mode. When, on the other hand, the motor is to operate with the higher rated voltage, the jumper conductor holder for the high voltage operation is coupled to the connection terminal holder, whereby the armature winding of the motor is connected in the star connection ($\lambda$) mode. Thus, coupling of the selected one of the jumper conductor holders to the connection terminal holder changes over the connection, so that the motor can operate with the selected one of the two rated voltages which have the relation of 1:2.

However, in each of the prior art disclosures, the lead-out wires used for connecting the motor to the power source have already been connected to the jumper conductor holder selected depending on the connection mode. Therefore, the procedure for change-over from one of the connection modes to the other has been troublesome and time-consuming in that not only the jumper conductor holder coupled already to the connection terminal holder must be replaced by the other jumper conductor holder, but also the lead wires must also be replaced.

While the situation will not be so serious when the lead wires can be replaced relatively easily, it is quite difficult to change the lead wires connected already to the jumper conductor holder when the motor is of the type which is designed to operate in a liquid or a gas whose electrical insulation resistance is not so high. Therefore, when the motor is to operate in such a liquid or a gas, it has been necessary to prepare two kinds of jumper conductor holders each having the lead wires connected thereto already. Since the length of the lead wires is generally as large as 300 m to 400 m in the case of a submersible motor, the preparation of such two kinds of jumper conductor holders each complete with the lead wires has been undesirable from the viewpoint of the cost which is considerably high.

SUMMARY OF THE INVENTION

With a view to obviate the prior art drawback pointed out above, it is a primary object of the present invention to provide a rotary electric machine operable with two rated voltages, in which the change-over between the rated voltages can be effected without releasing the electrical connection between the rotary electric machine and the lead wires.

The rotary electric machine according to the present invention includes an armature winding which is an assembly of a plurality of coils each having a connection terminal at at least one end thereof. Part of connection terminals among all of them are used as power input terminals connected to power supply terminals regardless of change-over between the rated voltages.

The connection among the connection terminals is suitably changed over so that the coil assembly can perform the function of the armature winding when the rated voltage is changed over.

The coils are housed within a casing. When so required, the coils are held fluid-tight in the casing so that they may not make electrical contact with a fluid. A connection terminal holder holding the connection terminals in a relation electrically insulated from one another is fixed to the casing.

Jumper conductors are provided for selectively connecting between the connection terminals. A jumper conductor holder holds these jumper conductors in a relation electrically insulated from one another. This jumper conductor holder is detachably coupled to the connection terminal holder so as to disconnectably electrically connect the connection terminals to each other.

It is preferable that the connection terminals are made in the form of female terminals, and that the jumper conductors have male terminals electrically connectable with such female terminals. This arrangement eliminates male terminals which are not electrically connected to the connection terminals.

When the rotary electric machine is to operate in a fluid whose electrical insulation resistance is lower than that of air or in a fluid which will corrode the jumper conductors, it is preferable to provide a sealing structure against the action of the fluid at the surrounding of the coupled portion between the connection terminal holder and the jumper conductor holder under the condition that the connection terminals and the jumper conductors have been coupled. It is preferable to provide an urging unit for pressing the jumper conductor holder against the connection terminal holder for ensuring coupling therebetween. It is also preferable that each of the jumper conductors is electrically insulated except the portions making electrical contact with the connection terminals. It is also preferable that the jumper conductors are planted in the jumper conductor holder made of an electrical insulator in such a manner that their mounted portions may not be exposed from the electrical insulator. It is further preferable that at least one of the jumper conductor holder and the connection terminal holder is covered with a resilient material at the surface opposite to the confronting surface of the other.

When the armature winding of the rotary electric machine operable with two rated voltages is selectively connectable in both of the delta connection mode ($\Delta$) and the double delta connection mode ($2\Delta$), the connection terminals held by the connection terminal holder are preferably disposed at the vertices of three congruent triangles in such a relation that each of the triangles includes the connection point of one of the commonly-connected power input terminal pairs, the connection terminal other than the other connection terminal used as the power input terminal of the coil in-phase with one of the two coils having the above-mentioned one of the commonly-connected power input terminals, and the connection terminal other than the other connection terminal used as the power input terminal of the coil in-phase with the other of the two coils having the above-mentioned one of the commonly-connected power input terminals. This arrangement is convenient in that the three jumper conductors of the same shape can be used to connect the armature winding in the double delta connection mode.

Also, when the armature winding of the rotary electric machine is selectively connectable in both of the delta connection mode and the double delta connection mode, the distance between the respective connection terminals other than the connection terminals used as the respective power input terminals of the two coils which are in-phase with each other among all of the coils is selected to be equal to the distance between the respective connection terminals other than the connection terminals used as the respective power input terminals of the two coils which are in-phase with each other but different from the former two coils. This arrangement is convenient in that at least two jumper conductors of the same shape among three can be used to connect the armature winding in the delta connection mode.

The jumper conductor holder has no lead wires connected to the power supply terminals. The lead wires connect the power input terminals directly to the power input terminals without passing through the connection terminal holder and the jumper conductor holder. When so required, a disconnectable connector including a plug and a plug socket may be provided at the portion of the machine casing through which the lead wires are led out.

PREFERRED EMBODIMENTS OF THE INVENTION

An application of the present invention to a submersible electric motor adapted to operate in water will now be described with reference to the drawings.

Figure 1:
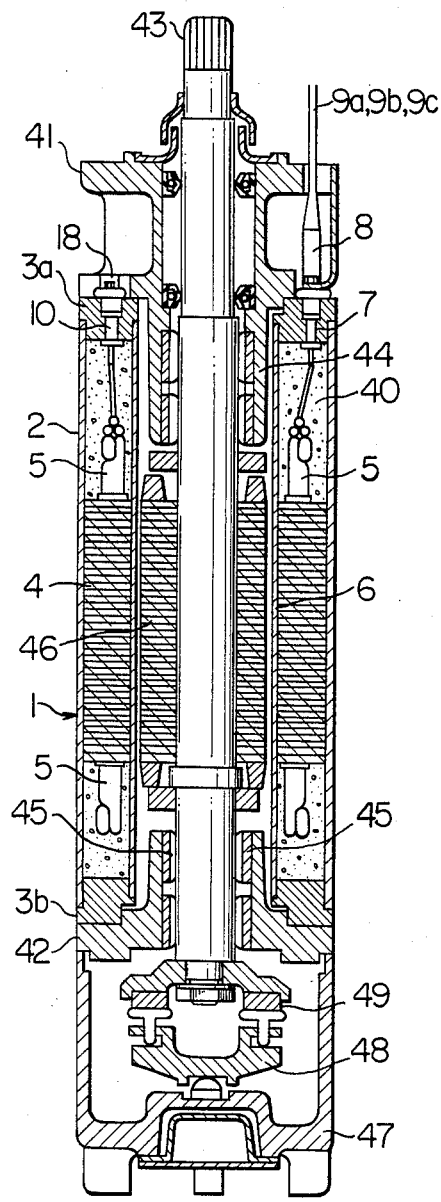
FIG. 1 is a longitudinal sectional view showing the structure of an embodiment of the rotary electric machine according to the present invention.
Figure 2:
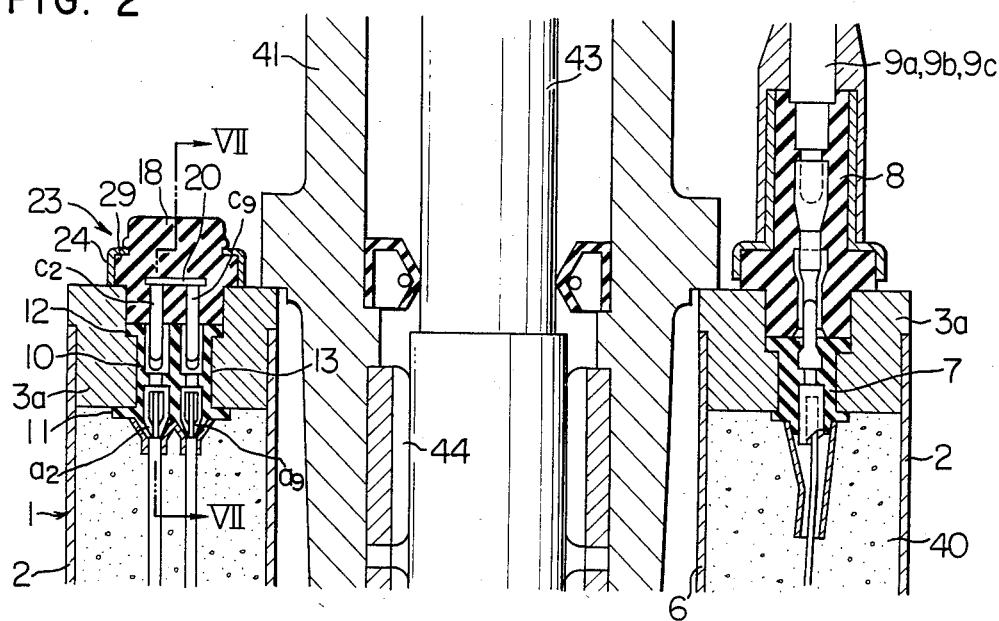
FIG. 2 is an enlarged view of part of FIG. 1.

Referring to FIGS. 1 and 2, a casing generally designated by the reference numeral 1 includes a hollow cylindrical outer frame 2 and a pair of annular closing members 3a and 3b fixed in the both ends respectively of the outer frame 2 by welding. Fixedly mounted in the outer frame 2 is a stator core 4 formed by laminating many annular iron sheets punched out from blanks by a press. Slots (not shown) are provided in the stator core 4, and an armature winding 5 is received in these slots. A hollow cylindrical can 6 made of a non-magnetic material is disposed in contact with the inner peripheral face of the stator core 4. This can 6 is welded at the outer peripheral portions of its both ends to the closing members 3a and 3b.

Figure 3:
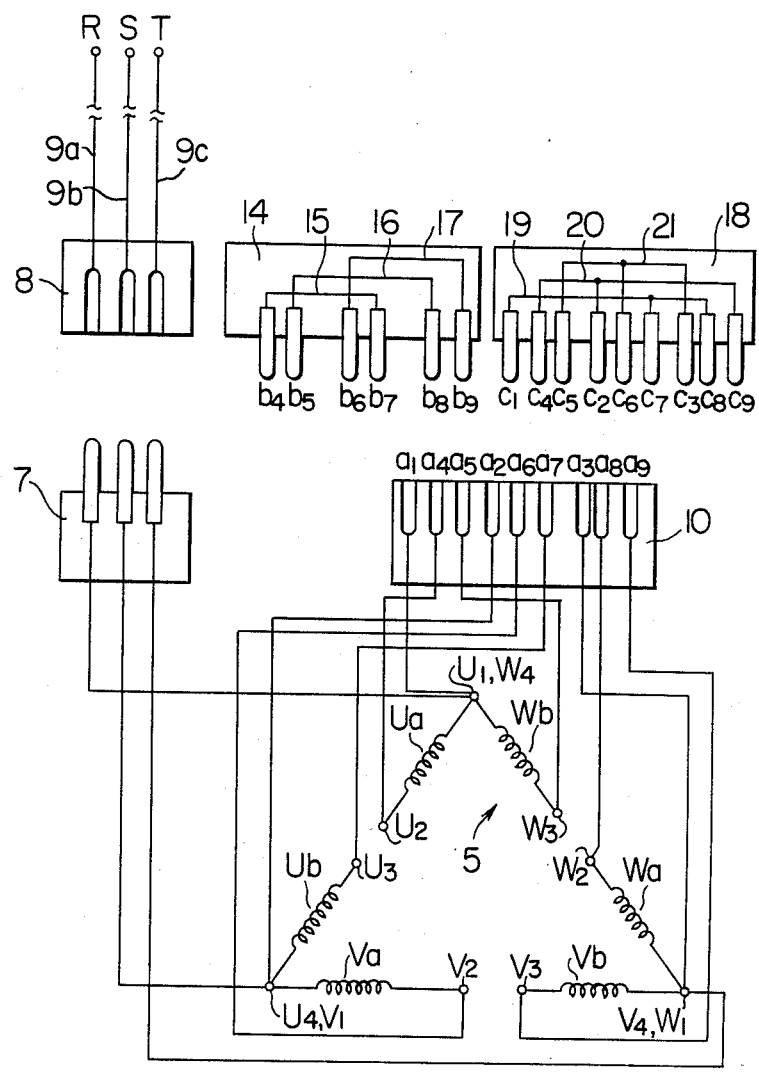
FIG. 3 is a connection diagram of the armature winding.

As best shown in FIG. 3, the armature winding 5 is composed of six coils Ua, Ub, Va, Vb, Wa and Wb which are arranged such that the coils Ua and Ub, the coils Va and Vb, and the coils Wa and Wb are in-phase respectively, and the coils Ua, Ub and Va, Vb; the coils Va, Vb and Wa, Wb; and the coils Wa, Wb and Ua, Ub are electrically 120° out of phase respectively. These respective coils Ua, Ub, Va, Vb, Wa and Wb have connection terminals $U_1$, $U_2$; $U_3$, $U_4$; $V_1$, $V_2$; $V_3$, $V_4$; $W_1$, $W_2$; and have connection terminals $U_1$, $U_2$; $U_3$, $U_4$; $V_1$, $V_2$; $V_3$, $V_4$; $W_1$, $W_2$; and $W_3$, $W_4$ as shown. FIG. 3 illustrates, by way of example, that these coils Ua to Wb can be selectively connected in both of the delta connection mode and the double delta connection mode. The connection terminals $U_1$, $U_4$, $V_1$, $V_4$, $W_1$ and $W_4$ are power input terminals connected to three-phase AC power supply terminals R, S and T regardless of change-over of the connection mode. The power input terminals $U_1$, $W_4$; $V_1$, $U_4$; and $W_1$, $V_4$ are commonly-connected to be connected through a three-core plug 7, a three-core plug socket 8 electrically connectable to the plug 7 and a switch (not shown) to the three-phase AC power supply terminals R, S and T by lead wires 9a, 9b and 9c, respectively. The three-core plug 7 is fixed to the outer side face of the closing member 3a.

Figure 6:
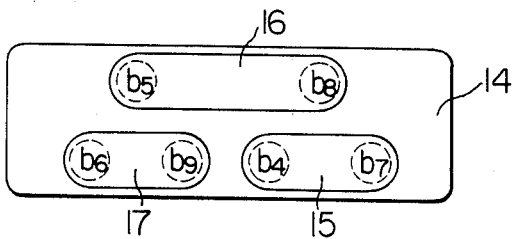
FIG. 6 is a view similar to FIG. 5 but showing another form of the jumper conductor arrangement.

The commonly-connected connection terminals $U_1$, $W_4$; $V_1$, $U_4$; and $W_1$, $V_4$, which are connected to the plug 7 on one hand, are extended, on the other hand, to terminate in female terminals $a_1$, $a_2$ and $a_3$ respectively which are held by a terminal holder 10. The remaining connection terminals $U_2$, $U_3$, $V_2$, $V_3$, $W_2$ and $W_3$ are also extended to terminate in female terminals $a_4$, $a_7$, $a_6$, $a_9$, $a_8$ and $a_5$ respectively which are also held by the terminal holder 10. This terminal holder 10 is made of a resilient electrical insulator and thus holds the female terminals $a_1$ to $a_9$ in a relation electrically insulated from one another. As shown in detail in FIG. 2, the terminal holder 10 is formed with two spaced flanges 11 and 12. The terminal holder 10 is press-fitted in a through-hole 13 bored in the closing member 3a, and its flanges 11 and 12 sandwich the associated portion of the closing member 3a therebetween, so that the terminal holder 10 is fixed in position in water-tight relation. A jumper conductor holder 14 as also shown in FIG. 6 is used for establishing the delta connection of the armature winding 5. This jumper conductor holder 14 holds three jumper conductors 15, 16 and 17 in a relation electrically insulated from one another. The jumper conductor 15 has male terminals $b_4$ and $b_7$ connectable with the female terminals $a_4$ and $a_7$ respectively, the jumper conductor 16 has male terminals $b_5$ and $b_8$ connectable with the female terminals $a_5$ and $a_8$ respectively, and the jumper conductor 17 has male terminals $b_6$ and $b_9$ connectable with the female terminals $a_6$ and $a_9$ respectively.

When this jumper conductor holder 14 is coupled to the connection terminal holder 10, the connection terminals $U_2$, $V_2$ and $W_2$ are electrically connected to the connection terminals $U_3$, $V_3$ and $W_3$ respectively thereby establishing the delta connection of the armature winding 5.

Another jumper conductor 18 is used for establishing the double delta connection of the armature winding 5. This jumper conductor holder 18 holds three jumper conductors 19, 20 and 21 in a relation electrically insulated from one another. The jumper conductor 19 has male terminals $c_1$, $c_7$ and $c_8$ connectable with the female terminals $a_1$, $a_7$ and $a_8$ respectively, the jumper conductor 20 has male terminals $c_2$, $c_4$ and $c_9$ connectable with the female terminals $a_2$, $a_4$ and $a_9$ respectively, and the jumper conductor 21 has male terminals $c_3$, $c_5$ and $c_6$ connectable with the female terminals $a_3$, $a_5$ and $a_6$ respectively.

When the jumper conductor holder 14 is removed from the coupled position, and the jumper conductor holder 18 is now coupled to the connection terminal holder 10, the connection terminals $U_1$, $W_4$, $U_3$ and $W_2$ are connected together, the connection terminals $U_4$, $V_1$, $V_3$ and $U_2$ are connected together, and the connection terminals $W_1$, $V_4$, $W_3$ and $V_2$ are connected together, thereby establishing the double delta connection of the armature winding 5.

Figure 4:
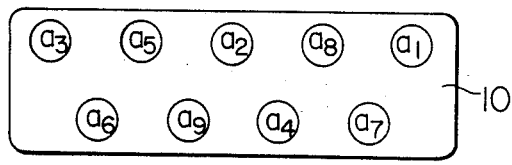
FIG. 4 is a schematic front elevation view showing one form of the arrangement of female terminals held by a connection terminal holder.
Figure 5:
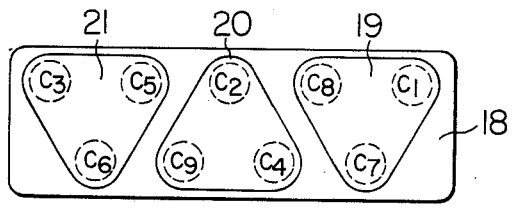
FIG. 5 is a schematic front elevation view showing one form of the arrangement of jumper conductors held by a jumper conductor holder.

The jumper conductors 19, 20 and 21 of the same shape as shown in FIG. 5 can be used when the female terminals $a_1$, $a_7$ $a_8$; $a_2$, $a_4$, $a_9$; and $a_3$, $a_5$, $a_6$ are disposed at the vertices of three congruent triangles respectively as shown in FIG. 4.

Further, when the distance between the female terminals $a_6$ and $a_9$ is selected to be equal to that between the female terminals $a_4$ and $a_7$ as shown in FIG. 4, the length of the jumper conductor 17 is equal to that of the jumper conductor 15, and the jumper conductors 15 and 17 of the same shape can be used as shown in FIG. 6.

The jumper conductor holders 14 and 18 are made of a resilient electrical insulator. The connection terminal holder 10 includes annular lips 22 surrounding the respective female terminals $a_1$ to $a_9$ as shown in FIG. 7, so that the couplings between the female terminals $a_1$ to $a_9$ and the male terminals $b_4$ to $b_9$ and $c_1$ to $c_9$ can be watertightly sealed.

Figure 7:
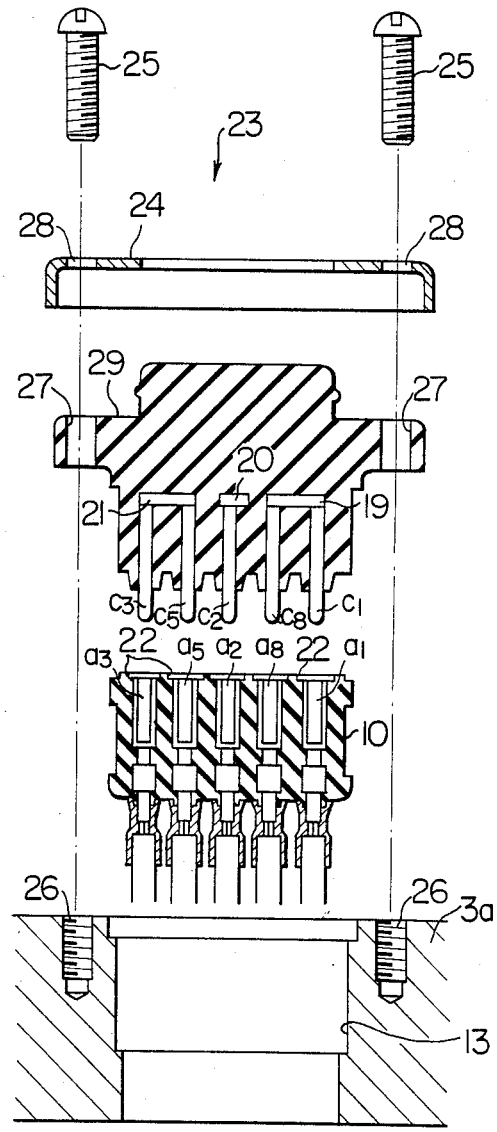
FIG. 7 is a sectional view taken along the line 7-7 in FIG. 2 to illustrate how various parts are assembled.

An urging unit generally designated by the reference numeral 23 in FIG. 7 includes an abutment member 24, set screws 25 for fixing this abutment member 24 to the closing member 3a, threaded holes 26 bored in the closing member 3a, aligned perforations 27 formed in the jumper conductor holder, and aligned perforations 28 formed in the abutment member 24.

The abutment member 24 is adapted to surround a flanged portion 29 of each of the jumper conductor holders 14 and 18. The set screws 25 passed through the perforations 28 and 27 are screwed into the threaded holes 26, so that either the jumper conductor holder 14 or the jumper conductor holder 18 can be pressed against the connection terminal holder 10 until the lips 22 are deformed.

Figure 8:
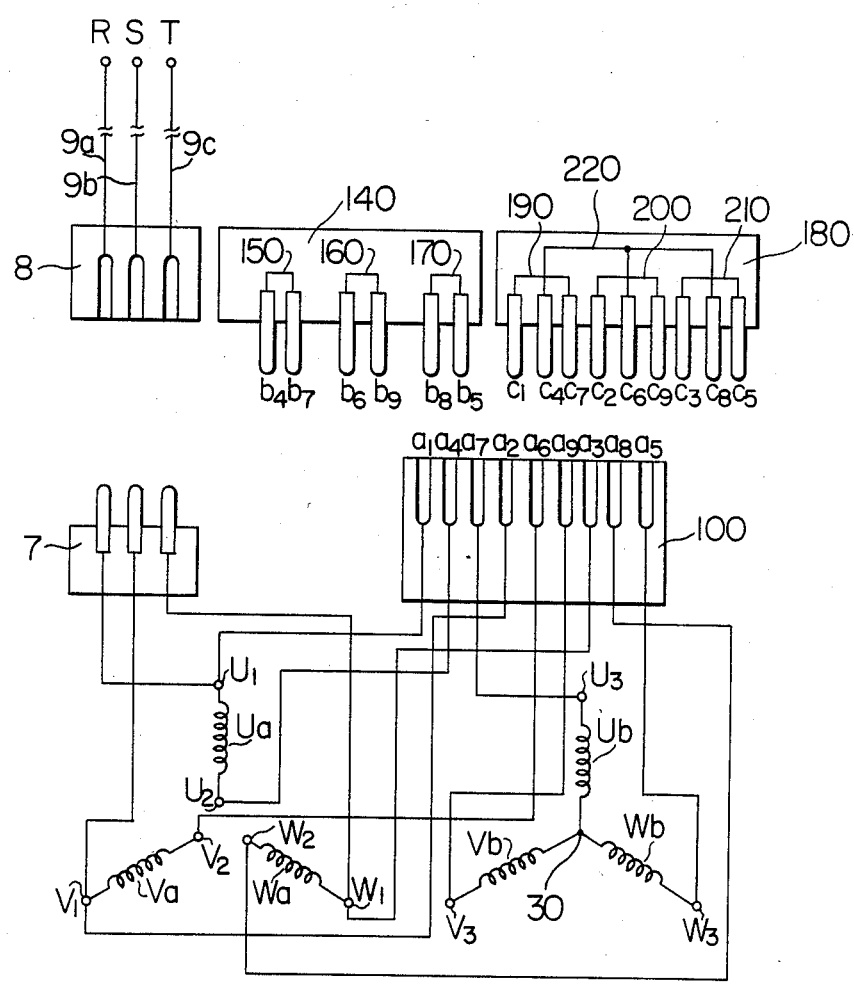
FIGS. 8 and 9 are connection diagrams showing other forms of the armature winding in the rotary electric machine according to the present invention.

FIG. 8 is a connection diagram of another form of the armature winding to which the present invention is applied. Referring to FIG. 8, six coils $U_a$, $U_b$, $V_a$, $V_b$, $W_a$ and $W_b$ constituting the armature winding 5 are divided into a first group composed of the three coils $U_a$, $V_a$ and $W_a$ which are electrically 120° out of phase respectively, and a second group composed of the three coils $U_b$, $V_b$ and $W_b$ which are also electrically 120° out of phase respectively. The three coils $U_a$, $V_a$ and $W_a$ constituting the first group have connection terminals $U_1$, $U_2$; $V_1$, $V_2$; and $W_1$, $W_2$ respectively at the both ends thereof. The connection terminals $U_1$, $V_1$ and $W_1$, which are power input terminals, are connected through a plug 7, a plug socket 8 and a switch (not shown) to three-phase AC power supply terminals R, S and T by lead wires 9a, 9b and 9c respectively, as in the case of FIG. 3.

The coils $U_b$, $V_b$ and $W_b$ constituting the second group have connection terminals $U_3$, $V_3$ and $W_3$ respectively only at one end thereof and are connected at the other end thereof commonly to a star point 30.

The connection terminals $U_1$, $V_1$, $W_1$, $U_2$, $V_2$, $W_2$, $U_3$, $V_3$ and $W_3$ are extended to terminate in female terminals $a_1$, $a_2$, $a_3$, $a_4$, $a_6$, $a_8$, $a_7$, $a_9$ and $a_5$ respectively which are held by a connection terminal holder 100.

A jumper conductor holder 140 is used for establishing the star connection of the armature winding 5. This jumper conductor holder 140 holds three jumper conductors 150, 160 and 170. At its both ends, the jumper conductor 150 has male terminals $b_4$ and $b_7$ connectable with the female terminals $a_4$ and $a_7$ respectively. At its both ends, the jumper conductor 160 has male terminals $b_6$ and $b_9$ connectable with the female terminals $a_6$ and $a_9$ respectively. At its both ends, the jumper conductor 170 has male terminals $b_8$ and $b_5$ connectable with the female terminals $a_8$ and $a_5$ respectively.

Another jumper conductor holder 180 is used for establishing the double star connection of the armature winding 5. This jumper conductor holder 180 holds four jumper conductors 190, 200, 210 and 220. At its both ends, the jumper conductor 190 has male terminals $c_1$ and $c_7$ connectable with the female terminals $a_1$ and $a_7$ respectively. At its both ends, the jumper conductor 200 has male terminals $c_2$ and $c_9$ connectable with the female terminals $a_2$ and $a_9$ respectively. At its both ends, the jumper conductor 210 has male terminals $c_3$ and $c_5$ connectable with the female terminals $a_3$ and $a_5$ respectively.

The jumper conductor 220 has male terminals $c_4$, $c_6$ and $c_8$ connectable with the female terminals $a_4$, $a_6$ and $a_8$ respectively for providing the star point.

Figure 9:
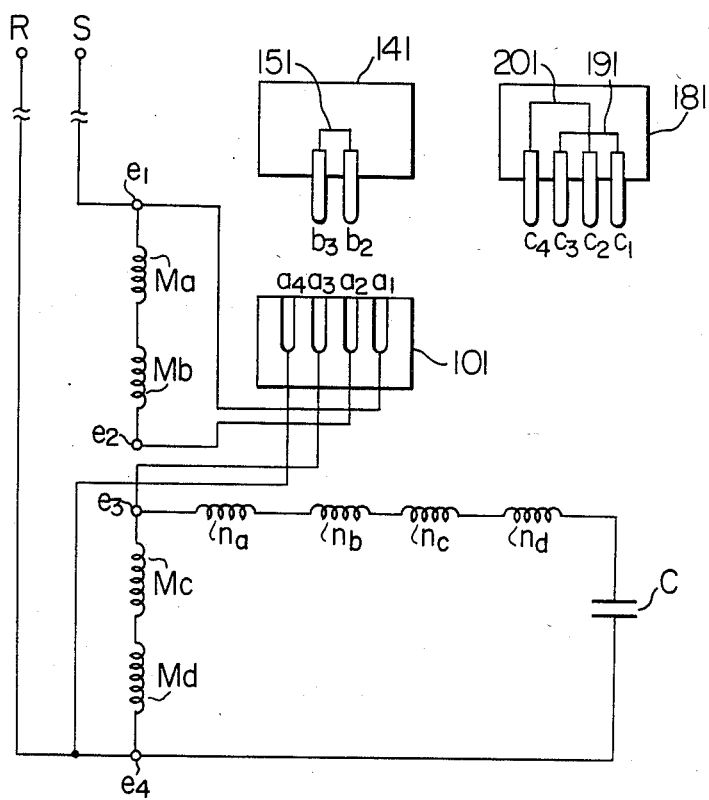

FIG. 9 is connection diagram of the main winding of a capacitor-start single-phase induction motor to which the present invention is applied, so that the motor can operate with any one of two rated voltages which have a 1:2 relation with each other.

The main winding is composed of four coils $M_a$, $M_b$, $M_c$ and $M_d$ providing four poles respectively. The coils $M_a$ and $M_b$ constitute a first group, and the coils $M_c$ and $M_d$ constitute a second group. The coils belonging to each of the groups are connected in series, and the first and second groups have connection terminals $e_1$, $e_2$; and $e_3$, $e_4$ at the both ends thereof respectively. The connection terminals $e_1$ and $e_4$ are power input terminals connected through a switch (not shown) to single-phase AC power supply terminals R and S.

The connection terminals $e_1$ to $e_4$ are extended to terminate in respective female terminals $a_1$ to $a_4$ held by a connection terminal holder 101.

A jumper conductor holder 141 is used for connecting the first and second coil groups in series when the motor is to operate with the higher rated voltage. This jumper conductor holder 141 holds a single jumper conductor 151. At its both ends, the jumper conductor 151 has male terminals $b_2$ and $b_3$ connectable with the female terminals $a_2$ and $a_3$ respectively.

Another jumper conductor holder 181 is used for connecting first and second coil groups in parallel when the motor is to operate with the lower rated voltage. This jumper conductor holder 181 holds two jumper conductors 191 and 201. At its both ends, the jumper conductor 191 has male terminals $c_1$ and $c_3$ connectable with the female terminals $a_1$ and $a_3$ respectively. At its both ends, the jumper conductor 201 has male terminals $c_2$ and $c_4$ connectable with the female terminals $a_2$ and $a_4$ respectively.

Coils $n_a$, $n_b$, $n_c$ and $n_d$ constitute the auxiliary winding are connected in series together with a capacitor C between the connection terminals $e_3$ and $e_4$.

Referring to FIGS. 1 and 2 again, a resin 40 having an inorganic material mixed therein is charged to fill the voids left after the stator core 4 and the armature winding 5 are inserted into the space defined by the outer frame 2, closing members 3a, 3b and can 6.

End brackets 41 and 42 are fixed to the closing members 3a and 3b respectively. A rotor shaft 43 is rotatably supported in these end brackets 41 and 42 by being journaled in radial bearings 44 and 45. A rotor core 46 is fixedly mounted on the rotor shaft 43 at the position opposite to the stator core 4. An end cover 47 is fixed to the lower part of the end bracket 42, and a thrust bearing block 48 is disposed on the end cover 47. The thrust bearing block 48 rotatably supports a thrust runner 49 fixed to the lower end of the rotor shaft 43.

What I claim is:

1. A rotary electric machine operable with selected one of two rated voltages, comprising an armature and a rotor rotating by being energized by a rotating magnetic field produced by said armature, an armature winding of said armature being an assembly of a plurality of coils which are changeably selectively connected to a power source whose voltage is changeable between said two rated voltages to produce the required rotating magnetic field in either case, wherein said machine comprises:
   (a) said armature including said armature winding, an armature core magnetically coupled to said armature winding and a casing supporting said armature core and said armature winding;
   (b) each of said coils having a connection terminal at at least one end thereof;
   (c) part of said connection terminals being used as power input terminals which are connected to the power supply terminals of said power source regardless of change-over of the rated voltage, and at least part of said connection terminals being used as connection changing terminals the connections among which are changeable such that said coils can produce the required rotating magnetic field when the rated voltage is changed over;
   (d) connection terminal holding means fixed to said casing to hold said connection changing terminals in a relation electrically insulated from one another;
   (e) a plurality of jumper conductors provided for selectively connecting said connection changing terminals with each other;
   (f) jumper conductor holding means holding said jumper conductors in a relation electrically insulated from one another, and detachably coupled to said connection terminal holding means so as to disconnectably electrically connect said jumper conductors to said connection changing terminals; and
   (g) lead wires electrically connecting said power input terminals to said power supply terminals without passing through said connection terminal holding means and said jumper conductor holding means.

2. A rotary electric machine as claimed in claim 1, wherein the number of said coils is six, and each of said coils has said connection terminals at the both ends thereof, the connection terminal at one end of each of said coils being used as said power input terminal, said power input terminals being always connected to said power supply terminals of said power source of three-phase regardless of change-over of the rated voltage in a manner so that every two of said power input terminals of different phases are connected in pair to each other.

3. A rotary electric machine as claimed in claim 2, wherein the number of said jumper conductors is three, and each of said three jumper conductors connects the connection terminals, to each other, at the respective other ends of the two coils arranged in-phase among said coils, whereby all of coils are connected in a delta connection mode.

4. A rotary electric machine as claimed in claim 2, wherein the number of said jumper conductors is three, and each of said three jumper conductors connects the connection point of the respective power input terminals of the two coils commonly connected to one of said power supply terminals to each of the connection terminals at the respective other ends of the two of said coils which are respectively arranged in-phase with the two coils whose respective power input terminals are commonly connected to said one power supply terminal, whereby all of said coils are connected in a double delta connection mode.

5. A rotary electric machine as claimed in claim 1, wherein said plural coils are divided into a first group and a second group each of which is composed of three coils electrically 120° out of phase relative to one another, each of said three coils constituting said first group having, at one and the other end thereof, connection terminals one of which at said one end is used as a power input terminal, each of said three coils constituting said second group having a connection terminal only at one end thereof and being connected at the other end thereof to a common star point, the number of said connection terminals being nine in total.

6. A rotary electric machine as claimed in claim 5, wherein the number of said jumper conductors is three, and wherein each of said three jumper conductors connects the respective connection terminals, to each other, at said other end and said one end respectively of the two coils which respectively belong to said first and second groups and which are arranged in-phase to each other, whereby all of said coils are connected in a star connection mode.

7. A rotary electric machine as claimed in claim 5, wherein the number of said jumper conductors is four one of which commonly connects the connection terminals at the respective other ends of said three coils belonging to said first groups to said star point, each of the remaining three of said jumper conductors connecting the power input terminal and the connection terminal, to each other, of the respective two coils which respectively belong to said first and said second groups and which are arranged in-phase to each other whereby all of said coils are connected in a double star connection mode.

8. A rotary electric machine as claimed in claim 1, wherein said plural coils are divided into a first group and second group each having, at the both ends thereof, connection terminals one of which is used as a power input terminal, and said first and second groups are selectively connected in series and in parallel with each other by said jumper conductors.

9. A rotary electric machine as claimed in claim 1, wherein said connection terminals terminate in female terminals, and said jumper conductors have male terminals selectively electrically connectable with said female terminals.

10. A rotary electric machine as claimed in claim 1, wherein said connection terminals held by said connection terminal holding means are disposed at the vertices of three congruent triangles in such a relation that each of said triangles includes the connection point of one of said commonly-connected power input terminal pairs, the connection terminal at the other end of the coil which is in-phase with one of the two coils having one of said commonly-connected power input terminal pair, and the connection terminal at the other end of the coil which is in-phase with the other of said two coils having the other of said commonly-connected power input terminal pair.

11. A rotary electric machine as claimed in claim 1, wherein the distance between the connection terminals at the respective other ends of the two coils arranged in-phase among all of said coils is selected to be equal to the distance between the connection terminals of the two coils arranged in-phase but different from that of said former two coils.

12. A submersible rotary electric machine operable with selected one of two rated voltages comprising:
an armature formed by an armature core and an armature winding for producing a rotating magnetic field;
a rotor magnetically coupled to said armature;
said armature winding being an assembly of a plurality of coils each having a connection terminal at at least one end thereof, part of said connection terminals being used as power input terminals connected by lead wires to power supply terminals regardless of change-over between connection modes, the connections among at least part of said connection terminals being changed over between the connection modes so that the assembly of said coils can perform the function of the armature winding in each mode;
a casing for fluid-tightly holding said coils so as not to make electrical contact with a fluid;
connection terminal holding means fixed to said casing for holding said connection terminals in a relation electrically insulated from one another;
jumper conductor holding means for holding a plurality of jumper conductors, which are provided to selectively electrically connect between said connection terminals, in a relation electrically insulated from one another, said jumper conductor holding means being detachably coupled to said connection terminal holding means so as to disconnectably electrically connect said jumper conductors to said connection terminals;
urging means for pressing said jumper conductor holding means against said connection terminal holding means; and
said lead wires electrically directly connecting said power input terminals to said power supply terminals without passing through said connection terminal holding means and said jumper conductor holding means.

13. A submersible rotary electric machine as claimed in claim 12, wherein a sealing structure for sealing coupled portions between said connection terminals and said jumper conductors against the action of the fluid is provided at the surrounding said coupled portions when said connection terminals and said jumper conductors are coupled.

14. A submersible rotary electric machine as claimed in claim 12, wherein said jumper conductor holding means holds said jumper conductors in a relation in which said jumper conductors are electrically insulated except the portions making electrical contact with said connection terminals.

15. A submersible rotary electric machine as claimed in claim 12, wherein said jumper conductors are mounted in said jumper conductor holding means in such a relation that their mounted portions may not be exposed from the electrical insulator.

16. A submersible rotary electric machine as claimed in claim 12, wherein at least one of said jumper conductor holding means and said connection terminal holding means is covered with a resilient material at the surface opposite to the confronting surface of the other.

17. A rotary electric machine operable with selected one of two rated voltages comprising:
an armature formed by an armature core and an armature winding for producing a rotating magnetic field;
a rotor magnetically coupled to said armature;
said armature winding being an assembly of a plurality of coils each having a connection terminal at at least one end thereof, part of said connection terminals being used as power input terminals connected by lead wires to power supply terminals regardless of change-over between connection modes, the connections among the connection terminals other than those used as said power input terminals being changed over between the connection modes so that the assembly of said coils can perform the function of the armature winding in each mode;
connection terminal holding means fixed to a casing containing said coil assembly for holding said connection terminals other than those used as said power input terminals in a relation electrically insulated from one another;
jumper conductor holding means for holding a plurality of jumper conductors, which are provided to selectively electrically connect said connection terminals other than those used as said power input terminals, in a relation electrically insulated from one another, said jumper conductor holding means being detachably coupled to said connection terminal holding means so as to disconnectably electrically connect said jumper conductors to said connection terminals other than those used as said power input terminals;
power input terminal holding means fixed to said casing for holding said power input terminals in a relation electrically insulated from one another; and said lead wires disconnectably electrically connecting said power input terminals held by said power input holding means to said power supply terminals.

18. A rotary electric machine as claimed in claim 1, wherein said casing seals said armature core and said armature winding, and further including a sealing structure for sealing coupled portions between said connection terminal holding means and said jumper conductor holding means.

19. A rotary electric machine as claimed in claim 1, wherein said connection terminal holding means includes a power input connection terminal holder and a change-over connection terminal holder independent from one another and fixed to different portions of said casing.

20. A rotary electric machine as claimed in claim 19, wherein said power connection terminal holder includes terminals terminating in one of female and male terminals, and said change-over connection terminal holder includes terminals terminating in the other of female and male terminals.

21. A rotary electric machine as claimed in claim 20, further including urging means for pressing said jumper conductor holding means against said change-over connection terminal holder.

22. A rotary electric machine as claimed in claim 1, wherein said casing is a fluid-tight casing, and said rotary electric machine is a submersible motor for submersion in a liquid or gas.

23. A submersible rotary electric machine as claimed in claim 12, wherein said connection terminals held by said connection terminal holding means are disposed at the vertices of three congruent triangles in such a relation that each of said triangles includes the connection point of one of said commonly-connected power input terminal pairs, the connection terminal at the other end of the coil which is in-phase with one of the two coils having one of said commonly-connected power input terminal pair, and the connection terminal at the other end of the coil which is in-phase with the other of said two coils having the other of said commonly-connected power input terminal pair.

24. A submersible rotary electric machine as claimed in claim 12, wherein said rotary electric machine is a submersible motor for submersion in a liquid or gas.

25. A rotary electric machine as claimed in claim 17, wherein said submersible casing gas-tightly contains said armature winding.

26. A rotary electric machine as claimed in claim 25, further including urging means for pressing said jumper conductor holding means against said connection terminal holding means.

27. A rotary electric machine as claimed in claim 17, wherein said connection terminals held by said connection terminal holding means are disposed at the vertices of three congruent triangles in such a relation that each of said triangles includes the connection point of one of said commonly-connected power input terminal pairs, the connection terminal at the other end of the coil which is in-phase with one of the two coils having one of said commonly-connected power input terminal pair, and the connection terminal at the other end of the coil which is in-phase with the other of said two coils having the other of said commonly-connected power input terminal pair.

28. A rotary electric machine as claimed in claim 17, wherein said casing is a fluid-tight casing, and said rotary electric machine is a submersible motor for submersion in a liquid or gas.

* * * * *